(12) United States Patent
Sato

(10) Patent No.: US 9,588,221 B2
(45) Date of Patent: Mar. 7, 2017

(54) RADAR APPARATUS AND METHOD OF PROCESSING INCOMING WAVES FOR THE RADAR APPARATUS

(71) Applicant: DENSO CORPORATION, Kariya, Aichi-pref. (JP)

(72) Inventor: Koichi Sato, Anjo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 298 days.

(21) Appl. No.: 14/401,276

(22) PCT Filed: May 16, 2013

(86) PCT No.: PCT/JP2013/063702
§ 371 (c)(1),
(2) Date: Nov. 14, 2014

(87) PCT Pub. No.: WO2013/172426
PCT Pub. Date: Nov. 21, 2013

(65) Prior Publication Data
US 2015/0097718 A1    Apr. 9, 2015

(30) Foreign Application Priority Data
May 16, 2012    (JP) .................. 2012-112475

(51) Int. Cl.
*G01S 7/40*    (2006.01)
*G01S 13/93*    (2006.01)
(Continued)

(52) U.S. Cl.
CPC ............... *G01S 13/04* (2013.01); *G01S 7/02* (2013.01); *G01S 7/032* (2013.01); *G01S 7/4004* (2013.01);
(Continued)

(58) Field of Classification Search
CPC . H01Q 1/42; H01Q 3/26; H01Q 3/267; G01S 7/02; G01S 7/03; G01S 7/032;
(Continued)

(56) References Cited

U.S. PATENT DOCUMENTS 5,485,159 A * 1/1996 Zhang ................... G01S 7/4004
340/580
5,929,802 A * 7/1999 Russell ................. G01S 13/931
342/70

(Continued)

FOREIGN PATENT DOCUMENTS

JP    H0659024 A    3/1994
JP    H10282229 A    10/1998
(Continued)

OTHER PUBLICATIONS

International Search Report (in Japanese with English Translation) for PCT/JP2013/063702, mailed Jun. 11, 2013; ISA/JP.
(Continued)

*Primary Examiner* — Bernarr Gregory
(74) *Attorney, Agent, or Firm* — Harness, Dickey & Pierce, P.L.C.

(57) ABSTRACT

In a radar apparatus, one frequency pair is extracted from among all frequency pairs, and an eigenvalue ratio in relation to the extracted pair is derived. The number of incoming waves is estimated according to the number of eigenvalue ratios each of which is not less than a reference threshold. Then, a proportion of the frequency pairs each estimated to have a plurality of incoming waves, relative to all frequency pairs (hereinafter referred to as plural detection proportion) is calculated as an evaluation value. These steps are repeated every time radar waves are transmitted and received. As a result, when a state where the plural detection proportion becomes not less than a specified proportion is detected over a specified number of cycles, it is determined (Continued)

that noise factor materials have adhered to a covering member.

14 Claims, 5 Drawing Sheets

(51) Int. Cl.
*G01S 13/04* (2006.01)
*G01S 7/03* (2006.01)
*G01S 13/34* (2006.01)
*G01S 13/42* (2006.01)
*H01Q 3/26* (2006.01)
*G01S 7/02* (2006.01)
*G01S 13/00* (2006.01)

(52) U.S. Cl.
CPC .............. *G01S 13/34* (2013.01); *G01S 13/42* (2013.01); *G01S 13/931* (2013.01); *H01Q 3/267* (2013.01); *G01S 2007/4039* (2013.01); *G01S 2013/9375* (2013.01)

(58) Field of Classification Search
CPC .......... G01S 13/02; G01S 13/04; G01S 13/06; G01S 13/08; G01S 13/32; G01S 13/34; G01S 13/42; G01S 13/88; G01S 13/93; G01S 13/931; G01S 2013/9371; G01S 2013/937; G01S 7/40; G01S 7/4004; G01S 7/4008; G01S 7/4021; G01S 7/4026; G01S 2007/403; G01S 2007/4034; G01S 2007/4039
See application file for complete search history.

(56) References Cited

U.S. PATENT DOCUMENTS

| | | | |
|---|---|---|---|
| 5,959,570 A * | 9/1999 | Russell | G01S 7/4004 342/70 |
| 6,469,659 B1 * | 10/2002 | Lajiness | G01S 7/4004 342/159 |
| 6,496,138 B1 * | 12/2002 | Honma | G01S 13/931 342/27 |
| 7,342,532 B1 * | 3/2008 | Matsuoka | G01S 7/032 342/118 |
| 7,486,222 B2 * | 2/2009 | Matsuoka | G01S 7/4004 342/165 |
| 2008/0129596 A1 | 6/2008 | Xin | |
| 2009/0207079 A1 | 8/2009 | Samukawa et al. | |
| 2010/0214153 A1 | 8/2010 | Kikuchi | |

FOREIGN PATENT DOCUMENTS

| | | |
|---|---|---|
| JP | 2003156560 A | 5/2003 |
| JP | 2006292679 A | 10/2006 |
| JP | 2009192422 A | 8/2009 |
| JP | 2010197133 A | 9/2010 |
| JP | 4722132 B2 | 4/2011 |
| JP | 2011127910 A | 6/2011 |

OTHER PUBLICATIONS

International Preliminary Report on Patentability for PCT/JP2013/063702, issued Nov. 18, 2014; ISA/JP.

* cited by examiner

FIG.5
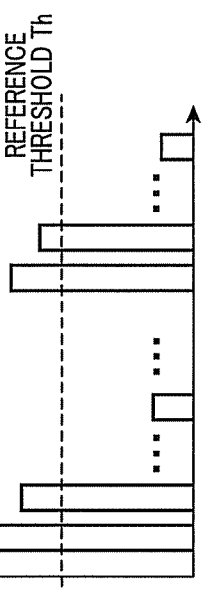
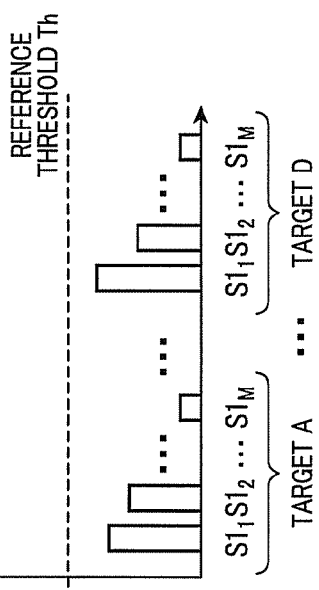
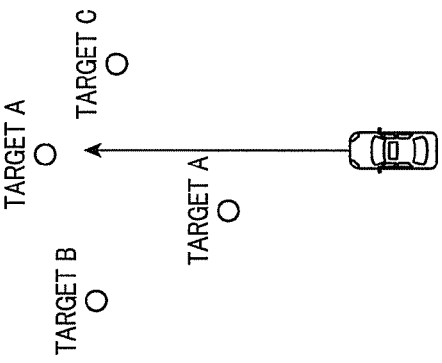

RADAR APPARATUS AND METHOD OF PROCESSING INCOMING WAVES FOR THE RADAR APPARATUS

CROSS REFERENCE TO RELATED APPLICATIONS

This application is a U.S. National Phase Application under 35 U.S.C. 371 of International Application No. PCT/JP2013/063702 filed on May 16, 2013 and published in Japanese as WO 2013/172426 A1 on Nov. 21, 2013. This application is based on and claims the benefit of priority from Japanese Patent Application No. 2012-112475 filed on May 16, 2012. The entire disclosures of all of the above applications are incorporated herein by reference.

BACKGROUND

Technical Field

The present invention relates to a radar apparatus for detecting a target and a method for processing incoming waves for the radar apparatus, and in particular to a radar apparatus using radio waves of a millimeter-wave band and a method for processing incoming waves for the radar apparatus.

Background Art

Use of radar apparatus is prevailing, which detects a target making use of radio waves of a millimeter-wave band. In such a radar apparatus, radio waves of a millimeter-wave band are transmitted as radar waves, and incoming waves generated with the reflection of the radar waves are received by a receiving antenna in which a plurality of antenna elements are arranged in an array. Based on the received information, the apparatus detects a distance to each target that has reflected the radar waves and an azimuth in which the target is present. Such a radar apparatus is well known as disclosed, for example, in PTL 1. The radar apparatus described in PTL 1 includes a radome having an outer surface in which a plurality of electrodes are provided.

In this radar apparatus, the radome has the outer surface in which a plurality of electrodes are provided. When a predetermined number of electrodes are in a state of being electrically conductive therebetween among the plurality of electrodes, it is determined that muddy water or ice (hereinafter referred to as noise factor materials), for example, has adhered to the outer surface of the radome.

PTL 1 JP-A-H06-059024

Technical Problem

Adhesion of such noise factor materials to the radome as mentioned above may cause trouble in transmitting or receiving radar waves. Specifically, the noise factor materials cause refraction or reflection of the radar waves, while disabling, in the radar apparatus, correct detection of a distance to a target and an azimuth in which the target is present. In other words, a failure occurs in the radar apparatus.

In order to detect the occurrence of such a failure, the radar apparatus described in PTL 1 is provided with the plurality of electrodes in the outer surface of the radome. However, such a structure leads to the complexity in the structure of the radome or further to the complexity in the structure of the radar apparatus itself.

In short, radar apparatus based on conventional art has a problem of not being able to detect the adhesion of the noise factor materials to the member covering the radar apparatus without complicating the structure of the radar apparatus.

SUMMARY

Therefore, it has thus been desired to provide a technique for enabling detection of the adhesion of the noise factor materials to a radar apparatus without complicating the structure thereof.

According to a typical mode related to the present disclosure, a radar apparatus including a transmitting/receiving means, covering member, target detecting means, azimuth estimating means, state detecting means and a determining means is provided.

Among these, the transmitting/receiving means repeatedly performs, at a cycle specified in advance, a transmission/reception cycle of transmitting radar waves from a transmitting antenna, and receiving incoming waves by a receiving antenna composed of a plurality of antenna elements, the incoming waves being generated by reflection of the radar waves transmitted from the transmitting antenna. The covering member allows passage of the radar waves therethrough and at least covers an opening face of the receiving antenna.

Further, the target detecting means detects targets that have reflected the radar waves, on the basis of the results of transmitting/receiving the radar waves, every time the transmission/reception cycle is performed by the transmitting/receiving means. Then, the azimuth estimating means estimates an arrival bearing that is an azimuth from which incoming waves corresponding to the respective targets detected by the target detecting means have arrived.

The state detecting means detects an adhered state in which, as a result of an estimation of the arrival bearing performed by the azimuth estimating means, a plural detection proportion is not less than a specified proportion. The plural detection proportion is a proportion of targets each having a plurality of arrival bearings, relative to all the targets detected by the target detecting means.

Further, when the state detecting means detects the adhered state over a specified number of times of cycle that is a specified number of times of transmission/reception cycle, the determining means determines that the covering member is adhered with noise factor materials that allow passage of the radar waves therethrough.

Specifically, when the noise factor materials have adhered to the covering member, there is a high probability that the incoming waves received by the receiving antenna are diffused or refracted by the noise factor materials. Fundamentally, a radar apparatus detects one arrival bearing for one target. However, when the diffused or refracted incoming waves are received as mentioned above, there is a high probability of detecting a plurality of arrival bearings for each of the detected targets.

Accordingly, when a state where the plural detection proportion is not less than a specified proportion is detected over a specified number of times of cycle, it may be determined that noise factor materials have adhered to the covering member.

As can be understood from the above, the radar apparatus is able to detect that the noise factor materials have adhered to the outer surface of the covering member, without the necessity of providing a plurality of electrodes to the outer surface of the covering member. In other words, the radar apparatus is able to provide a technique with which the adhesion of the noise factor materials can be detected without complicating the structure.

In the radar apparatus, when a user of the radar apparatus, for example, is notified of the adhesion of the noise factor materials to the outer surface of the covering member, the noise factor materials that have adhered to the covering member can be removed by the user. Thus, the radar apparatus can be restored from a failed state to a normal state.

Further, in the radar apparatus, the target detecting means may detect frequency peaks as the targets, the frequency peaks being detected on the basis of the results of frequency analysis of incoming waves received by the receiving antenna. In this case, the azimuth estimating means may derive, for each of the frequency peaks, a correlation matrix of a received signal in each of the antenna elements, and estimate the number of arrival bearings for one target from the results of eigenvalue decomposition of the correlation matrix.

In general, the method of using eigenvalue decomposition of a correlation matrix in a process of estimating an arrival bearing exhibits high resolution and thus is a method having high accuracy in estimating an arrival bearing.

Accordingly, such a radar apparatus has high reliability in the results of estimating the number of arrival bearings, and further is able to highly accurately determine whether or not the noise factor materials have adhered to the covering member.

The state detecting means of the radar apparatus may include a ratio deriving means and a wave number estimating means estimating the number of reflections.

In this case, the ratio deriving means derives an eigenvalue ratio that indicates a ratio of a maximum eigenvalue having a maximum value to a comparative eigenvalue, each of which is an eigenvalue other than the maximum eigenvalue, among the eigenvalues resulting from the eigenvalue decomposition of the correlation matrix. The wave number estimating means estimates the number of arrival bearings for one target as being plural, when each eigenvalue ratio derived by the ratio deriving means is not less than a reference threshold that is specified in advance to define the arrival bearing for one target as being one.

Such a radar apparatus is able to achieve high reliability in the results of estimating the number of arrival bearings. Further, according to another typical example related to the present disclosure, a method of processing incoming waves for a radar apparatus is also provided. This method exerts functions similar to those of the radar apparatus described above.

BRIEF DESCRIPTION OF THE DRAWINGS

In the accompanying drawings:

FIG. 5 is an explanatory diagram illustrating an example of the adhesion detection process.

DETAILED DESCRIPTION OF THE PREFERRED EMBODIMENTS

With reference to FIGS. 1 to 5, hereinafter is described a radar apparatus related to an embodiment of the present invention.

Figure 1:
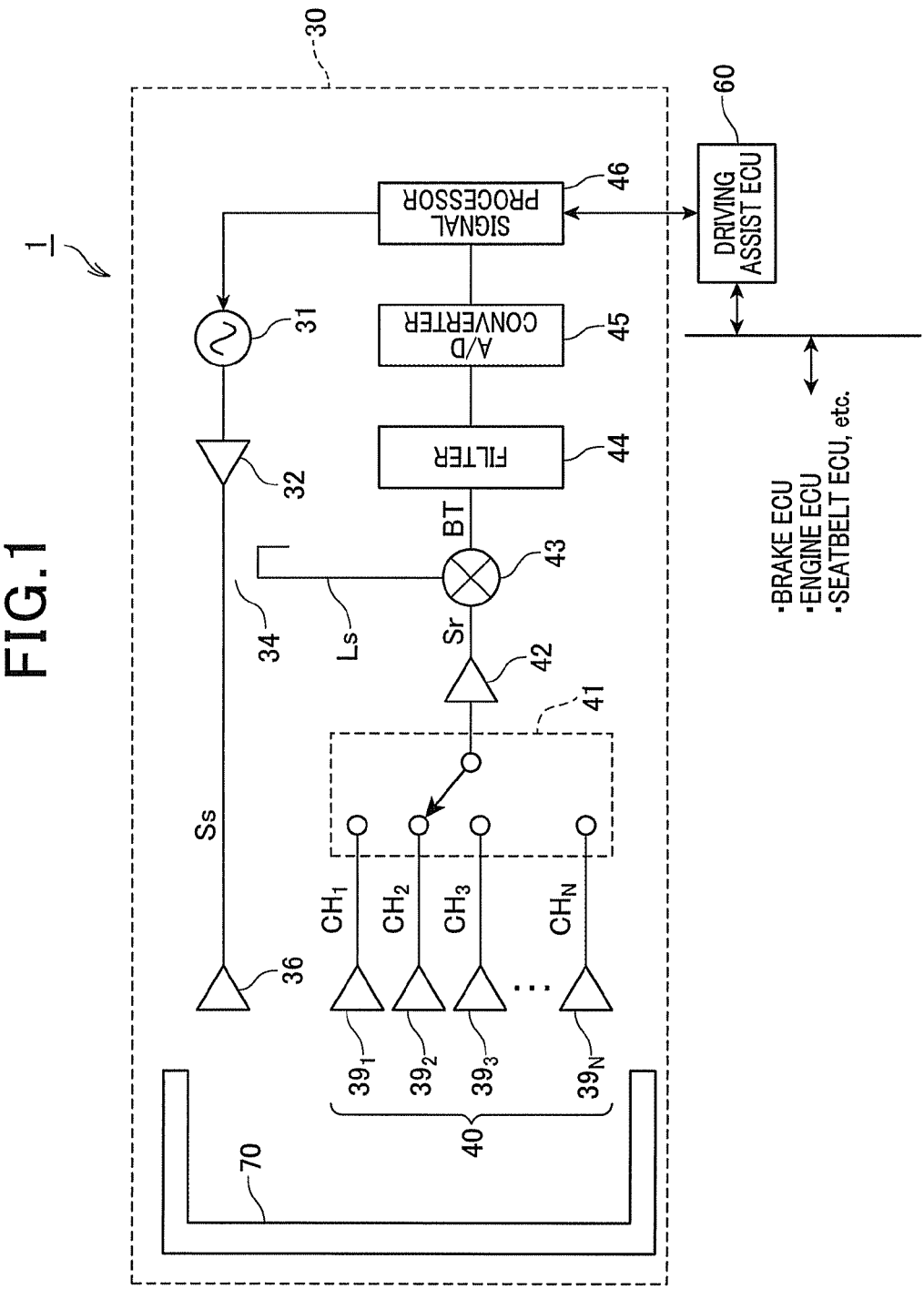
FIG. 1 is a block diagram illustrating a schematic configuration of a driving assist system centering on a radar apparatus related to an embodiment of the present invention.

FIG. 1 shows a configuration of a driving assist system 1 which is provided with the radar apparatus. The driving assist system 1 is used being mounted to a car, and includes a radar apparatus 30 and a driving assist electronic control unit (hereinafter referred to as driving assist ECU) 60.

The radar apparatus 30 transmits radio waves of a millimeter-wave band as radar waves and receives reflected waves that have been generated by the reflection of the radar waves (hereinafter also referred to as incoming waves), thereby detecting a target that has reflected the radar waves and generating information related to the target (hereinafter referred to as target information).

The target in the present embodiment represents a point on an object at which the radar waves are reflected. Usually, one object is detected as one target. Further, the target information in the present embodiment at least includes a distance to a detected target from the vehicle (the vehicle equipped with the radar apparatus), an azimuth in which the target is present relative to a reference axis specified in advance (i.e. angle, hereinafter referred to as arrival bearing), and a relative speed between the vehicle and the target.

The driving assist ECU 60 is mainly configured by a known microcomputer which at least includes ROM, RAM and CPU. The driving assist ECU 60 at least includes a bus controller for performing communication via a LAN communication bus.

The driving assist ECU 60 is connected with, although not shown, a warning buzzer, a monitor, a cruise control switch, a target inter-vehicle distance setting switch, and the like. Further, the driving assist ECU 60 is connected, via the LAN communication bus, with a brake electronic control unit (brake ECU), an engine electronic control unit (engine ECU), a seatbelt electronic control unit (seatbelt ECU), and the like.

Specifically, the driving assist ECU 60 is configured to perform driving assist control under which the driving of the vehicle is assisted on the basis of the target information from the radar apparatus 30. For example, the driving assist control includes adaptive-cruise control under which an inter-vehicle distance between a preceding vehicle and the vehicle is retained to a preset distance, and pre-crash safety control under which an alarm is outputted or the seatbelt is taken up when the inter-vehicle distance between the vehicle and the preceding vehicle becomes equal to or smaller than the preset distance.

Radar Apparatus

The radar apparatus 30 includes an oscillator 31, amplifier 32, distributor 34, transmitting antenna 36, receiving antenna 40, receiving switch 41, amplifier 42, mixer 43, filter 44, A/D converter 45 and signal processor 46. The radar apparatus 30 is configured as a so-called millimeter-wave radar apparatus of FMCW type.

The oscillator 30 generates a high-frequency signal of a millimeter-wave band, which is modulated so as to have a modulation cycle composed of a ascending interval in which the frequency linearly increases (gradually increases) relative to time and a descending interval in which the frequency linearly decreases (gradually decreases). The amplifier 32 amplifies the high-frequency signal generated by the oscillator 31.

The distributor 34 distributes electric power that is an output from the amplifier 32 into a transmission signal Ss and a local signal Ls. The transmitting antenna 36 radiates radar waves according to the transmission signal Ss. The receiving antenna 40 includes N (N is a natural number of 2 or more) antennas $39_1$ to $39_N$ that receive radar waves. The antennas $39_1$ to $39_N$ are arranged in an array. The antennas $39_1$ to $39_N$ are allocated with channels $CH_1$ to $CH_N$, respectively.

The radar apparatus 30 of the present embodiment includes a covering member 70 that covers the transmitting antenna 36 and the receiving antenna 40. The covering member 70 is formed of a material that allows radar waves to pass therethrough. The covering member 70 covers a transmission angle range of radar waves in the transmitting antenna 36 and a reception angle range of incoming waves in the receiving antenna 40. Specifically, the covering member 70 corresponds such as to a so-called radome provided to the radar apparatus 30, or a front grill of a car at which the radar apparatus 30 is set up.

The receiving switch 41 sequentially selects one of the antennas $39_1$ to $39_N$ and supplies downstream a received signal Sr from the selected antennas $39_1$ to $39_N$. The amplifier 42 amplifies the received signal Sr supplied from the receiving switch 41.

The mixer 43 mixes the local signal Ls with the received signal Sr that has been amplified by the amplifier 42, and generates a beat signal BT indicating a difference between the frequency of the transmission signal Ss and that of the received signal Sr. The filter 44 removes unnecessary signal components from the beat signal BT generated by the mixer 43. The A/D converter 45 samples the output of the filter 44 and converts the sampled output to digital data.

The signal processor 46 uses the sampling data of the beat signal BT to detect a target that has reflected the radar waves, while performing a target recognition process for generating target information of the target. The signal processor 46 is mainly configured by a known microcomputer that includes at least ROM, RAM and CPU. The signal processor 46 further includes an arithmetic processing unit (e.g., DSP) for performing high-speed Fourier transformation (FFT), for example, with respect to the data retrieved via the A/D converter 45.

Specifically, in the radar apparatus 30, when the oscillator 31 is oscillated according to an instruction from the signal processor 46, a high-frequency signal is generated by the oscillator 31. Then, the high-frequency signal is amplified by the amplifier 32 and the amplified signal is subjected to electric power distribution of the distributor 34 to generate the transmission signal Ss and the local signal Ls. Further, the radar apparatus 30 transmits the transmission signal Ss, from among these signals Ss and Ls, as radar waves via the transmitting antenna 36.

Then, the radar waves transmitted from the transmitting antenna 36 and reflected by a target (i.e. incoming waves) are received by all of the antennas $39_1$ to $39_N$ configuring the receiving antenna 40. Then, only the received signal Sr received by the receiving channel $CH_i$ (i=1 to N) that has been selected by the receiving switch 41 is amplified by the amplifier 32 and then supplied to the mixer 43. The mixer 43 mixes the received signal Sr with the local signal Ls from the distributor 34 to generate the beat signal BT. Then, the beat signal BT is removed with unnecessary signal components by the filter 44, followed by sampling by the A/D converter 45 for retrieval by the signal processor 46.

The receiving switch 41 switches between the channels $CH_1$ to $CH_N$ so that all the channels are selected by a predetermined number of times (e.g., 512 times) in one modulation cycle of the radar waves. In synchrony with the switching timing, the A/D converter 45 carries out sampling.

In other words, in one modulation cycle of the radar waves, sampling data are accumulated for each of the channels $CH_1$ to $CH_N$ and for each of the rising and descending intervals of the radar waves.

Target Recognition Process

In the following description, a target recognition process performed by the radar apparatus 30 is discussed.

The target recognition process is started at a cycle predetermined in advance.

Figure 2:
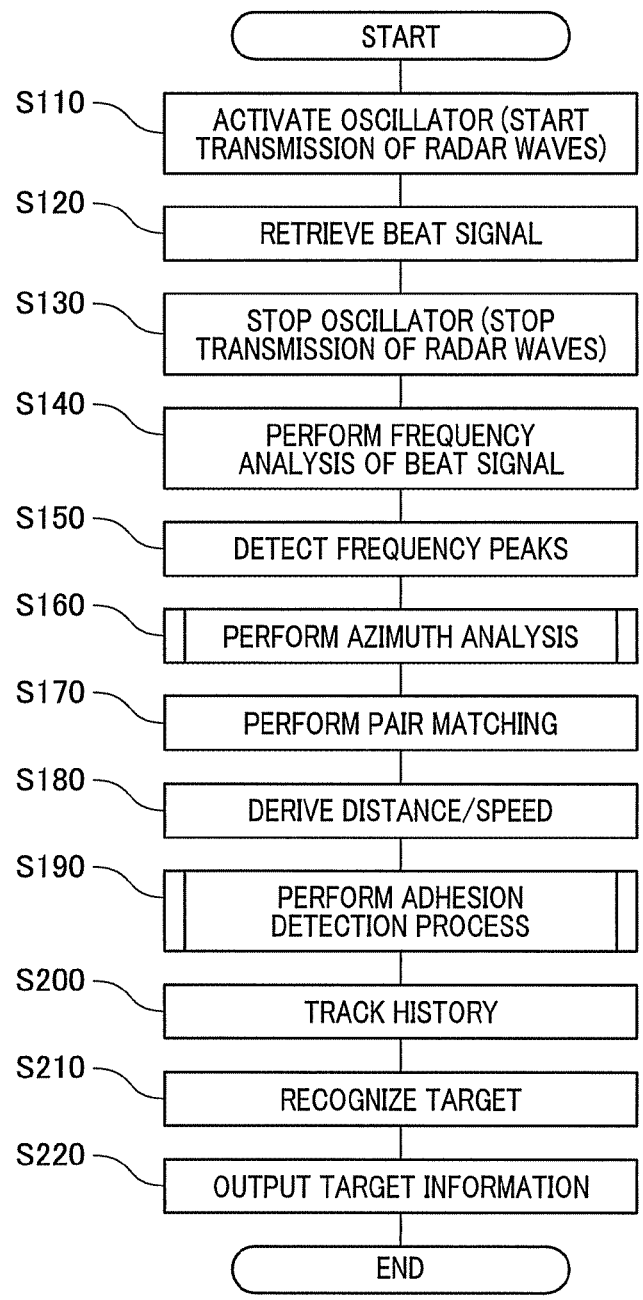
FIG. 2 is a flow chart illustrating a procedure of a target recognition process.

As shown in FIG. 2, when the target recognition process is started, the oscillator 31 is activated first to start transmission of radar waves (step S110). Then, a sampling value of the beat signal BT is acquired via the A/D converter 45 (step S120). After acquiring as many sampling values as needed, the oscillator 31 is stopped to stop transmission of the radar waves (step S130).

Then, frequency analysis (FFT processing in the present embodiment) is performed for the sampling values acquired at step S130 to obtain a power spectrum of the beat signal BT for each of the receiving channels $CH_1$ to $CH_N$ and for each of the rising/descending intervals (step S140). The power spectrum indicates the frequencies included in the beat signal BT and the intensities in the respective frequencies.

Then, for the ascending interval, frequency peaks $fbu_{1-m}$ that are present on the power spectrum are detected, and also for the descending interval, frequency peaks $fbd_{1-m}$ that are present on the power spectrum are detected (step S150). The detected frequency peaks fbu and fbd imply a probability of the presence of candidates of the target (hereinafter referred to as target candidates) that is the source of generation of the incoming waves.

Specifically, at step S150 of the present embodiment, an average spectrum is derived. The average spectrum is derived by arithmetically averaging the power spectra obtained for the respective receiving channels CH by all the receiving channels. Then, the frequencies each corresponding to a peak point of a frequency whose intensity exceeds a preset threshold (i.e. frequencies having extremely large intensity in the average spectrum) are detected as frequency peaks fbu and fbd.

Then, for each of the frequency peaks fbu and fbd, an azimuth analysis process is performed (step S160). The azimuth analysis process estimates an arrival bearing that indicates an azimuth (i.e. angle relative to a reference axis) of the target candidate corresponding to the frequency peak fbu or fbd, and an arrival electric power that indicates a received power in receiving the incoming waves from the target candidate. Details of the azimuth analysis process are discussed later.

Based on the arrival bearing and the arrival power estimated at step S160, pair matching is performed (step S170). The pair matching is a known process of matching the frequency peaks $fbu_{1-m}$ against the frequency peaks $fbd_{1-m}$, which are regarded to correspond to the reflection of the radar waves from an identical target, and registering the peaks. Hereinafter, a set of the frequency peaks fbu and fbd that have been matched and registered is referred to as frequency pair.

Specifically, at step S170 of the present embodiment, for all the combinations of the frequency peaks fbu of the ascending interval and the frequency peaks fbd of the descending interval, it is determined whether or not a difference in the arrival power and a difference in the angle of the arrival bearing are each within an allowable range specified in advance. As a result of the determination, if both of the difference in the arrival power and the difference in the angle of the arrival bearing are each within the allowable range, the set of the frequency peaks is rendered to be a frequency pair.

Further, for the registered frequency pairs, a known process used in a radar apparatus of FMCW type is applied to thereby derive a distance to a target candidate from the radar apparatus 30 and a relative speed between the target candidate and the vehicle (equipped with the radar apparatus) (step S180). At step S180 of the present embodiment, the speed of each target candidate is derived on the basis of the relative speed between the target candidate and the vehicle, and the speed of the vehicle. At the same time, it is determined whether the target candidate is a stationary object or a moving object. Information obtained by adding an azimuth in which the target candidate is present, to the derived distance and relative speed (speed) is correlated to each frequency pair and registered as a target candidate.

Subsequently, although the details are discussed later, an adhesion detection process is performed to determine whether or not the noise factor materials have adhered to the covering member 70 (step S190). The noise factor materials here are the materials that allow the radar waves to pass therethrough, and refract or reflect the radar waves by being adhered to the covering member. The noise factor materials include, for example, ice, rain droplets and muddy water.

Further, a history tracking process is performed (step S200), where the history tracking process, which is defined as a process for tracking how the frequency pairs change cycle by cycle, i.e., over time, is performed to detect a frequency pair corresponding to an identical target. This process is performed on the basis of the information on the frequency pairs registered at step S180 of the present-time transmission/reception cycle (hereinafter referred to as present-cycle pairs) and the information of the frequency pairs registered in the previous transmission/reception cycle (hereinafter referred to as previous-cycle pairs).

Specifically, in the history tracking process (step S200) of the present embodiment, all the combinations of the previous-cycle pairs and the present-cycle pairs (hereinafter referred to as combined pairs) are set, and any one of the combined pairs is retrieved. Then, the information of the previous-cycle pair (i.e. distance, speed, azimuth, etc.) in the retrieved combined pair is used as a basis of estimation to derive the position where the present-cycle pair corresponding to the previous-cycle pair is present (hereinafter referred to as estimated position) and the speed of the present-cycle pair (hereinafter referred to as estimated speed). Since derivation of the estimated position and the estimated speed is a known process, detailed description is omitted here. However, for example, a Kalman filter or the like may be used to estimate the time-series behavior of the frequency pair (i.e. target candidate), and the results of the estimation may be used as the estimated position and the estimated speed.

Then, in the history tracking process, the derived estimated position and the estimated speed, and the position and the speed derived from the present-cycle pair are used as bases to derive a position difference and a speed difference between the both. Specifically, the position difference refers to a difference between the position derived from the present-cycle pair (i.e. the position of the target candidate corresponding to the present-cycle pair) and the estimated position. Also, the speed difference refers to a difference between the speed derived from the present-cycle pair (i.e. the speed of the target candidate corresponding to the present-cycle pair) and the estimated speed.

Further, only when the position difference is smaller than a reference distance specified in advance, and the speed difference is smaller than an upper limit speed difference specified in advance, the frequency pair configuring the combined pair is regarded to correspond to an identical target (i.e. regarded to have history tracking). Thus, the count value of a connection counter of the present-cycle pair is updated to a value that is a value incremented by 1 from the count value of the connection counter of the previous-cycle pair.

Specifically, in the history tracking process of the present embodiment, a present-cycle pair having history tracking related to a previous-cycle pair takes over the information (count value of the connection counter) of the corresponding previous-cycle pair, while, for a present-cycle pair having no history tracking in relation to a previous-cycle pair, the count value of the connection counter is retained to "0".

In the target recognition process, a frequency pair that has been recognized as having a history track quantity of not less than a recognition threshold specified in advance is registered as a target (step S210). Specifically, at step S210 of the present embodiment, the fact that the count value of the connection counter is not less than the recognition threshold is regarded that a history track quantity of not less than the recognition threshold has been confirmed.

Then, the target information on the target registered at step S210 is outputted to the driving assist ECU 60 (step S220).

It should be noted that, in the adhesion detection process of step S190, if an adhesion flag is set up to indicate the adhesion of the noise factor materials to the covering member 70, diagnosis information including the adhesion of the noise factor materials to the covering member 70 is outputted, at step S220, to the driving assist ECU 60. In this case, the driving assist ECU 60 outputs, via the warning buzzer or the monitor, that the noise factor materials have adhered to the covering member 70.

After that, the target recognition process of the present cycle is terminated until the next iteration.

Azimuth Analysis Process

Figure 3:
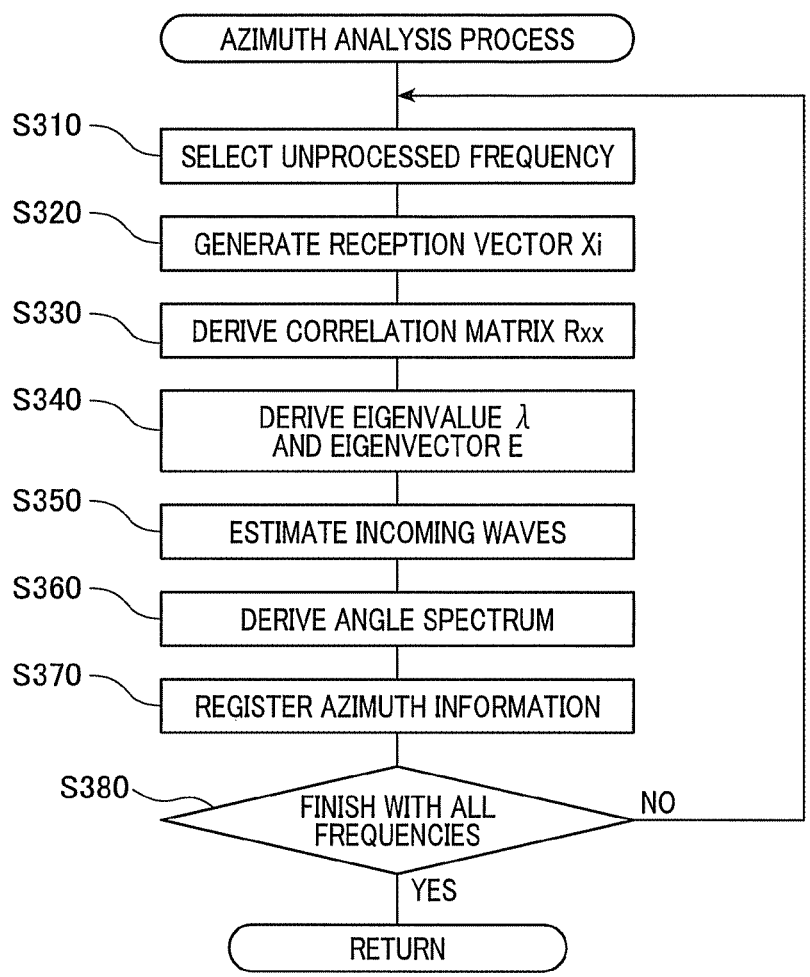
FIG. 3 is a flow chart illustrating a procedure of an azimuth analysis process.

The azimuth analysis process is started at step S160 of the target recognition process. As shown in FIG. 3, from among the frequency peaks fbu extracted from the power spectrum in the ascending interval and the frequency peaks fbd extracted from the power spectrum in the descending interval, one that has not yet been processed in the azimuth analysis process is selected (step S310).

Then, as indicated in the following Formula (1), a reception vector Xi(k) is generated which is obtained by extracting the signal components of the selected frequency (FFT processing result data) from the power spectra of all of the channels $CH_1$ to $CH_N$ and arraying the extracted signal components (step S320). In the present embodiment, a plurality of nulls (i.e. 0 values) may be added as virtual data in generating the reception vector Xi(k) in order to increase the number of data.

In Formula (1), reference "T" indicates a vector transpose.

$$Xi(k) = \{x_1(k), x_2(k), \ldots, x_N(k)\}^T \quad (1)$$

Based on the generated reception vector Xi(k), a correlation matrix Rxx(k) is generated according to Formula (2) (step S330). In Formula (2), reference "H" indicates a complex transpose matrix.

$$Rxx(k) = Xi(k) Xi^H(k) \quad (2)$$

Then, eigenvalues $\lambda_1$ to $X_N$ (where $\lambda_1 \geq \lambda_2 \ldots \lambda_N$) of the correlation matrix Rxx generated at step S330 are obtained, while eigenvectors $E_1$ to $E_N$ corresponding to the eigenvalues $\lambda_1$ to $X_N$, respectively, are calculated (step S340).

In the eigenvalues $\lambda_1$ to $X_N$, the number of the eigenvalues X of not less than a threshold Th specified in advance is estimated as an incoming wave number L (where L<N) (step S350). Since the method of estimating the incoming wave number L is a known one and various other methods are also known, description of the details of the method is omitted here. However, as an example, a value corresponding to a thermal noise power may be specified as the threshold Th.

Then, a noise eigenvector $E_{NO}$ composed of an eigenvector corresponding to (N-L) eigenvalues of not less than the threshold Th is defined by the following Formula (3). Then, an evaluation function $P_{MU}(\theta)$ shown in Formula (4) is obtained. In Formula (4), $a(\theta)$ indicates a complex response of the receiving antenna 40 in relation to an azimuth 8 which is based on the travel direction of the own vehicle.

$$E_{NO} = \{e_{L+1}, e_{L+2}, \ldots e_{L+N}\} \quad (3)$$

$$P_{MU}(\theta) = \{a^H(\theta)a(\theta)\}/\{a^H(\theta)E_{NO}E_{NO}^H a(\theta)\} \quad (4)$$

An angle spectrum (MUSIC spectrum) obtained from the evaluation function $P_{MU}(\theta)$ is set, being ensured to diverge in the azimuth 8 that coincides with the direction from which the incoming waves have arrived to thereby create sharp peaks. Therefore, arrival bearings $\theta_1$ to $\theta_L$ of the incoming waves, i.e. the azimuths of target candidates, are obtained by detecting the peaks of the MUSIC spectrum (step S360). It should be noted that, at step S360 of the present embodiment, an $i^{th}$ diagonal component of a matrix S expressed by the following Formula (5) is obtained. The $i^{th}$ diagonal component of the matrix S corresponds to the received power of an arrival bearing $\theta_i$ and thus, in the present embodiment, is treated as an arrival power of the arrival bearing $\theta_i$ (where i=1 to L). In Formula (5), A is a direction matrix, $\sigma^2$ is a thermal noise power, and Rxx-$\sigma^2$I is an autocorrelation matrix as an instantaneous value.

$$S = (A^H A)^{-1} A^H (Rxx - \sigma^2 I) A (A^H A)^{-1} \quad (5)$$

Subsequently, the azimuth information for the frequency peaks extracted at step S310 is registered (step S370). Specifically, at step S370 of the present embodiment, when the number L of incoming waves is 1, the arrival bearing $\theta$ and the arrival power of the incoming waves are registered as the azimuth information. When the number L of incoming waves is 2 or more (i.e. plural number), the arrival bearing $\theta$ and the arrival power of each of the incoming waves are registered as the azimuth information. It should be noted that, at step S370 of the present embodiment, the eigenvalues $\lambda$ derived for the frequency peaks are correlated to the respective frequency peaks and registered.

Then, it is determined whether or not steps S310 to S370 have been performed for all of the frequency peaks fbu and the frequency peaks fbd (step S380). As a result of the determination, if steps S310 to S370 have been performed for not all of the frequency peaks fbu and the frequency peaks fbd, (NO at step S380), control returns to step S310. At step S310, the frequency peaks for which steps S310 to S370 have not yet been performed are extracted, and then control proceeds to step S320.

On the other hand, as a result of the determination at step S380, if steps S310 to S370 have been performed for all of the frequency peaks fbu and the frequency peaks fbd (YES at step S380), the present azimuth analysis process is terminated and control returns to step S170 of the target recognition process.

Adhesion Detection Process

Figure 4:
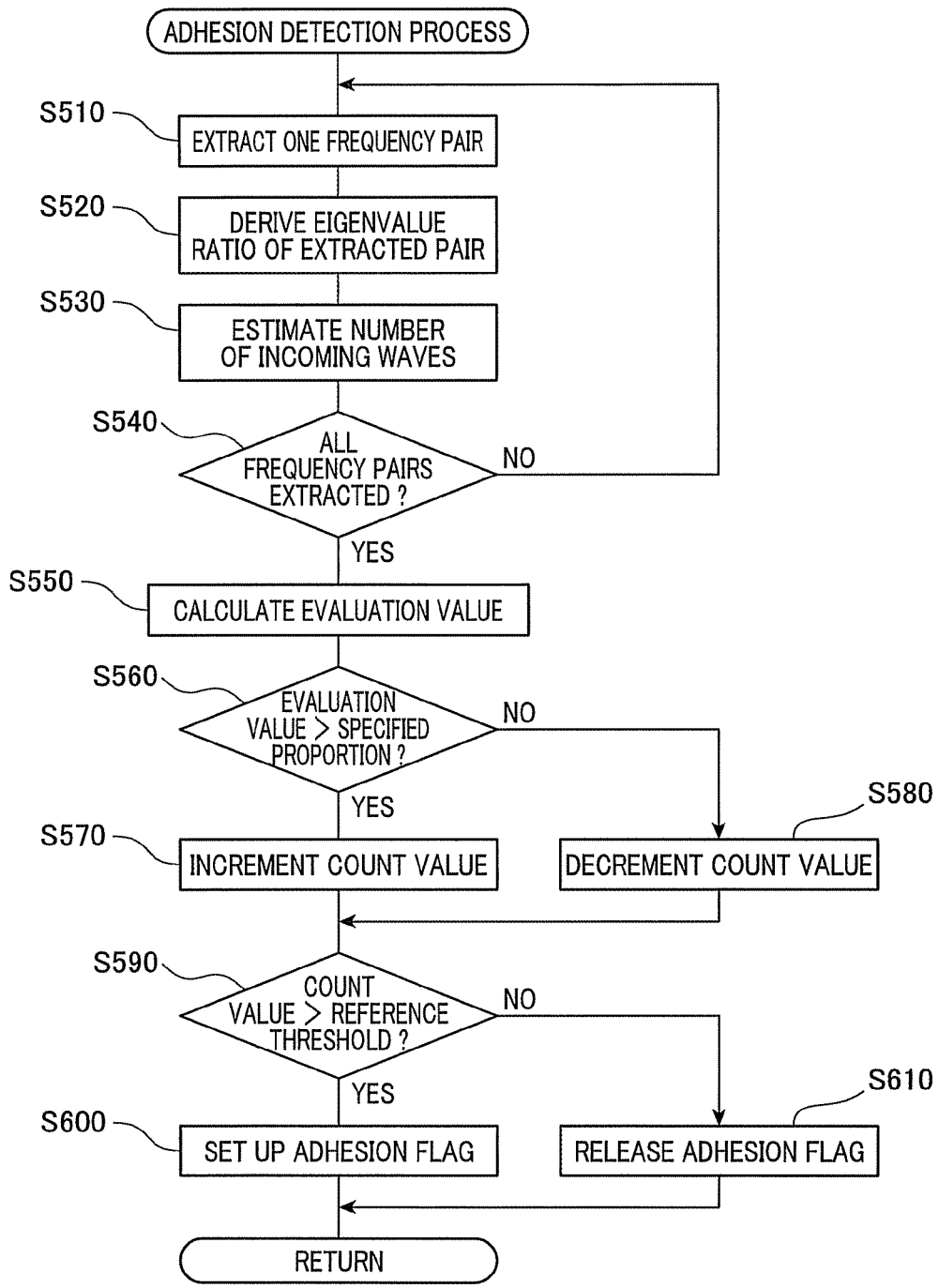
FIG. 4 is a flow diagram illustrating a procedure of an adhesion detection process.

As shown in FIG. 4, when the adhesion detection process is started at step S190 of the target recognition process, one frequency pair that has not been subjected to the adhesion detection process is extracted, first, from among all the frequency pairs (step S510). Hereinafter, the frequency pair extracted at step S510 is referred to as extracted pair.

Then, an eigenvalue ratio $S1_M$ with respect to the extracted pair is derived (step S520). The eigenvalue ratio $S1_M$ derived at step S520 is a ($S1_M = \lambda_M/\lambda_1$) index which is obtained by dividing each comparative eigenvalue $\lambda_M$ by a maximum eigenvalue $\lambda_1$.

However, the maximum eigenvalue $\lambda_1$ here refers to an eigenvalue $\lambda$ having a maximum value among the eigenvalues $\lambda_1$ to $\lambda_N$ derived in the course of the azimuth analysis process performed for the frequency peaks fbu and the frequency peaks fbd configuring an extracted peak. Also, the comparative eigenvalue $\lambda_M$ here refers to each eigenvalue $\lambda$ other than the maximum eigenvalue $\lambda_1$ among the eigenvalues $\lambda_1$ to $\lambda_N$. Accordingly, the reference character M is from 2 to N.

The eigenvalue ratio $S1_M$, when it is derived from the eigenvalues $\lambda$ corresponding to the incoming waves having strong an eigenvalue $\lambda$ corresponding to incoming waves and an eigenvalue $\lambda$ corresponding to thermal noise.

Then, the number of incoming waves for the extracted pair is estimated (step S530). Specifically, at step S530, the number of incoming waves is estimated according to the number of the eigenvalue ratios $S1_M$ of not less than the preset reference threshold Th among the eigenvalue ratios $S1_M$ derived at step S520. More specifically, if the number of the eigenvalue ratios $S1_M$ of not less than the reference threshold Th is estimated to be 0, the number of incoming waves for the extracted pair is 1. If the number of the eigenvalue ratios $S1_M$ of not less than the reference threshold Th is 1, the number of incoming waves for the extracted pair is estimated to be 2. If the number of the eigenvalue ratios $S1_M$ of not less than the reference threshold Th is 2, the number of incoming waves for the extracted pair is estimated to be 3.

Then, for all the frequency pairs, it is determined whether or not steps S510 to S530 have been performed (step S540).

As a result of the determination at step S540, if steps S510 to S530 have been performed for not all of the frequency pairs (NO at step S540), control returns to step S510. Then, for a new frequency pair, as an extracted pair, among the frequency pairs that have not been subjected to the present adhesion detection process, steps S520 and S530 are performed.

On the other hand, if steps 510 to S530 have been performed for all of the frequency pairs, (YES at step S540), an evaluation value VB is calculated (step S550). The evaluation value VB of the present embodiment refers to a proportion of the frequency pairs in each of which the presence of a plurality of incoming waves has been estimated, among all the frequency pairs.

It is determined whether or not the evaluation value VB is larger than a specified proportion (step S560). As a result of the determination at step S560, if the evaluation value VB is larger than the specified proportion (YES at step S560), the covering member 70 is regarded to be in an adhered state where the noise factor materials have adhered to the member. Then, the count value of an adhesion counter is incremented (step S570). It should be note that the adhesion counter is a counter provided in advance to count the number times of transmission/reception cycle, in which the adhered state has been detected.

After that, control proceeds to step S590.

On the other hand, as a result of the determination at step S560, if the evaluation value VB is not more than the specified proportion (NO at step S560), it is regarded that no adhered state has been caused and thus the count value of the adhesion counter is decremented (step S5380). After that, control proceeds to step S590.

The specified proportion is provided as a reference value indicating that the covering member 70 has a high probability of being in a state of being adhered with the noise factor materials. The specified proportion may be an eigenvalue specified such as by experiments. Alternatively, the specified proportion may be variably set depending on the total number of the frequency pairs detected at step S170 of the target recognition process. In the latter case, the larger the total number of the detected frequency pairs is, the higher the estimation accuracy as to the creation of the adhered state is regarded to be. Thus, in the latter case, the specified proportion may be set to a small value.

The number by which the count value of the adhesion counter is incremented at step S570, or the number by which the number of the count value of the adhesion counter is decremented at step S580 may be a fixed value set in advance or may be variably set depending on the number of frequency pairs detected at step S170 of the target recognition process. In the latter case, the larger the total number of the detected frequency pairs is, the higher the estimation accuracy as to the creation of the adhered state is regarded to be. Thus, in the latter case, a large value may be variably set as desired.

At the subsequent step S590, it is determined whether or not the count value of the adhesion counter is larger than the reference threshold Th (see FIG. 5). As a result of the determination at step S590, if the count value of the adhesion counter is larger than the reference threshold (YES at step S590), an adhesion flag is set up to indicate that the specified number of times of transmission/reception cycle and the adhered state are continued (step S600). After that, the present adhesion detection process is terminated and control returns to step S200 of the target recognition process.

On the other hand, as a result of the determination at step S590, if the count value of the adhesion counter is not more than the reference threshold Th (NO at step S590), the adhesion flag is released to indicate that the specified number of times of transmission/reception cycle and the adhered state are not continued (step S610). Then, the present adhesion detection process is terminated and control returns to step S200 of the target recognition process.

It should be noted that the reference threshold Th at step S590 is specified as a threshold which corresponds to the number of transmission/reception cycles (i.e. a specified number of cycles), the number indicating that the covering member 70 has a high probability of being in a state of being adhered with the noise factor materials. The reference threshold Th may be a fixed value specified such as by experiments, or may be variably set depending on the total number of the frequency pairs detected at step S170 of the target recognition process. In the latter case, the larger the total number of the detected frequency pairs is, the higher the estimation accuracy as to the creation of the adhered state is regarded to be. Thus, in the latter case, a small number of times of transmission/reception cycle may be set.

Specifically, the radar apparatus 30 normally detects one arrival bearing per one target. However, when the noise factor materials have adhered to the covering member 70, the incoming waves received by the receiving antennas 40 have a high probability of being diffused or refracted by the noise factor materials. In this case, there is a high probability that a plurality of arrival bearings are detected for each of detected targets.

Taking account of this, in the adhesion detection process of the present embodiment, the covering member is determined to have been adhered with the noise factor materials when the adhered state is detected over the specified number of times of cycle.

Advantageous Effects of the Embodiment

As described above and as shown in FIG. 5, in the radar apparatus 30, the covering member 70 can be determined to have been adhered with the noise factor materials, when the state where the plural detection proportion is not less than the specified proportion is detected over the specified number of times of cycle. FIG. 5 illustrates a situation in which four targets A to D are detected ahead of the vehicle.

The radar apparatus 30 uses a method of using eigenvalue decomposition of a correlation matrix (so-called MUSIC) as a method of estimating an arrival bearing. Accordingly, higher reliability is achieved in the estimation results of the number of arrival bearings. Further, the radar apparatus 30 is able to highly accurately determine whether or not the noise factor material have adhered to the covering member 70.

Thus, the radar apparatus 30 is able to detect the adhesion of the noise factor materials to the outer surface of the covering member without having to provide a plurality of electrodes to the outer surface of the covering member.

As described above, the radar apparatus 30 is able to provide a technique with which the adhesion of the noise factor materials can be detected without complicating the structure.

Further, the radar apparatus 30 outputs that the noise factor materials have adhered to the covering member 70, to the driving assist ECU 60, and the driving assist ECU 60 outputs accordingly via the warning buzzer or the monitor.

As a result, the occupants, for example, of the own vehicle are able to recognize the adhesion of the noise factor materials to the covering member 70, or further the probability that a failure has occurred in the radar apparatus 30. Then, when the adhered noise factor materials are removed by the occupants, for example, of the own vehicle, the radar apparatus 30 can be restored from the failed state to the normal state.

Other Embodiments

An embodiment of the present invention has so far been described. However, the present invention should not be construed as being limited to the foregoing embodiment, but may be implemented in various modes within a scope not departing from the spirit of the present invention.

For example, the foregoing embodiment uses an estimation method based on a MUSIC spectrum (Multiple Signal Classification (MUSIC)) as a method of estimating an arrival bearing in the azimuth analysis process. However, the method of estimating an arrival bearing should not be construed as being limited to this.

Specifically, in the present invention, the method of estimating an arrival bearing may use the known AIC (Akaike Information Criterion) or MLD (Minimum Description Length) based on the results of eigenvalue decomposition, or may use the known DBF (digital beam forming).

However, when AIC is used as the method of estimating an arrival bearing, it is preferable that the evaluation value VB derived at step S550 of the adhesion detection process reflects the results of comparison between information quantity paradigms AIC(1) and AIC(m) of Akaike. When MLD is used as the method of estimating an arrival bearing, it is preferable that the evaluation value VB derived at step S550 of the adhesion detection process reflects the results of comparison between MDL(1) and MDL(m) as information quantity paradigms. The bracketed numerical values and references here are indexes indicating the order of information quantity paradigms.

Further, when DBF is used as the method of estimating an arrival bearing, the evaluation value VB may be derived on the basis of the degree of increase in the side lobes of angle spectra corresponding to respective frequency peaks. This is because, when an arrival bearing is estimated from DBF and if a plurality of incoming waves are present for one target, the power of side lobes in the power directivity pattern increases compared to the case where one incoming wave is present for one target.

Further, in the foregoing embodiment, the adhesion detection process is performed at step S190 of the target recognition process. However, the timing of performing the adhesion detection process should not be construed as being limited to this. For example, the adhesion detection process may be performed immediately after the azimuth analysis process or immediately after performing step S350 in the azimuth analysis process. In this case, the number of incoming waves for one frequency peak estimated at step S350 may be used as the number of incoming waves for an extracted pair.

Specifically, the adhesion detection process may be performed at any timing as far as the timing enables estimation of the number of incoming waves for one target.

In the foregoing embodiment, the radar apparatus to which the present invention is applied is an FMCW radar apparatus. However, the radar apparatus to which the present invention is applied should not be construed as being limited to this. In other words, the radar apparatus to which the present invention is applied may, for example, be a radar apparatus that transmits/receives continuous waves (e.g., dual-frequency CW radar), or may be a radar apparatus that transmits/receives radar waves which are modulated into pulses (e.g., pulse radar).

In other words, the radar apparatus to which the present invention is applied may be any apparatus as far as the apparatus is able to repeatedly perform the transmission/reception cycle of radar waves at a specified cycle, while being able to estimate an arrival bearing for one target.

REFERENCE SIGNS LIST

1 . . . Driving assist system
30 . . . Radar apparatus
31 . . . Oscillator
32 . . . Amplifier
34 . . . Distributor
36 . . . Transmitting antenna
39 . . . Antenna
40 . . . Receiving antenna
41 . . . Receiving switch
42 . . . Amplifier
43 . . . Mixer
44 . . . Filter
45 . . . A/D converter
46 . . . Signal processor
70 . . . Covering member
60 . . . Driving assist ECU

The invention claimed is:

1. A radar apparatus comprising:
transmitting/receiving means for repeatedly performing, at a cycle specified in advance, a transmission/reception cycle of transmitting radar waves from a transmitting antenna, and receiving incoming waves by a receiving antenna composed of a plurality of antenna elements, the incoming waves being generated by reflection of the radar waves transmitted from the transmitting antenna;
a covering member for allowing passage of the radar waves therethrough and at least covering an opening face of the receiving antenna;
target detecting means for detecting targets that have reflected the radar waves, on the basis of results of transmitting/receiving the radar waves, every time the transmission/reception cycle is performed by the transmitting/receiving means;
azimuth estimating means for estimating an arrival bearing that is an azimuth from which incoming waves corresponding to the respective targets detected by the target detecting means have arrived;
state detecting means for detecting an adhered state in which, as a result of an estimation of the arrival bearing performed by the azimuth estimating means, a plural detection proportion is not less than a specified proportion, the plural detection proportion being a proportion of targets each having a plurality of arrival bearings, relative to all the targets detected by the target detecting means; and
determining means for determining that the covering member is adhered with noise factor materials that allow passage of the radar waves therethrough, when the state detecting means detects the adhered state over a specified number of cycles that is a specified number of transmission/reception cycles.

2. The radar apparatus according to claim 1, wherein:
the target detecting means is configured to detect frequency peaks as the targets, the frequency peaks being detected on the basis of results of frequency analysis of incoming waves received by the receiving antenna; and
the azimuth estimating means is configured to derive, for each of the frequency peaks, a correlation matrix of a received signal in each of the antenna elements, and estimate the number of arrival bearings for one target from results of eigenvalue decomposition of the correlation matrix.

3. The radar apparatus according to claim 2, wherein the state detecting means comprises:
a ratio deriving means for deriving an eigenvalue ratio that indicates a ratio of a maximum eigenvalue having a maximum value to a comparative eigenvalue, each of which is an eigenvalue other than the maximum eigenvalue, among the eigenvalues resulting from the eigenvalue decomposition of the correlation matrix; and
a wave number estimating means for estimating the number of arrival bearings for one target as being plural, when each eigenvalue ratio derived by the ratio deriving means is not less than a reference threshold that is specified in advance to define the arrival bearing for the one target as being one.

4. The radar apparatus according to claim 3, wherein the determining means is configured to decrease the specified number of cycles, as a probability of being in the adhered state becomes higher.

5. The radar apparatus according to claim 4, wherein the determining means is configured to render the probability of being in the adhered state as being higher, as the number of targets detected by the target detecting means increases.

6. The radar apparatus according to claim 5, wherein the determining means is configured to render the probability of being in the adhered state as being higher, as the plural detection proportion becomes higher.

7. The radar apparatus according to claim 2, wherein the determining means is configured to decrease the specified number of cycles, as the probability of being in the adhered state becomes higher.

8. The radar apparatus according to claim 7, wherein the determining means is configured to render the probability of being in the adhered state as being higher, as the number of targets detected by the target detecting means increases.

9. The radar apparatus according to claim 8, wherein the determining means is configured to render the probability of being in the adhered state as being higher, as the plural detection proportion becomes higher.

10. The radar apparatus according to claim 1, wherein the determining means is configured decrease the specified number of cycles, as the probability of being in the adhered stated becomes higher.

11. The radar apparatus according to claim 10, wherein the determining means is configured to render the probability of being in the adhered state as being higher, as the number of targets detected by the target detecting means increases.

12. The radar apparatus according to claim 11, wherein the determining means is configured to render the probability of being in the adhered state as being higher, as the plural detection proportion becomes higher.

13. The radar apparatus according to claim 10, wherein the determining means is configured to render the probability of being in the adhered state as being higher, as the plural detection proportion becomes higher.

14. A method of processing incoming waves for a radar apparatus, the apparatus comprising:
    transmitting/receiving means for repeatedly performing, at a cycle specified in advance, a transmission/reception cycle of transmitting radar waves from a transmitting antenna, and receiving incoming waves by a receiving antenna composed of a plurality of antenna elements, the incoming waves being generated by reflection of the radar waves transmitted from the transmitting antenna; and
    a covering member that allows passage of the radar waves therethrough and covers at least an opening face of the receiving antenna,
    characterized in that the method comprises:
    detecting targets that have reflected the radar waves, on the basis of results of transmitting/receiving the radar waves, every time the transmission/reception cycle is performed by the transmitting/receiving means;
    estimating an arrival bearing that is an azimuth from which incoming waves corresponding to the detected respective targets have arrived;
    detecting an adhered state over a specified number of cycles that is a specified number of transmission/reception cycles when, as a result of an estimation of the arrival bearing, the adhered state is implied, the adhered state being a state where a plural detection proportion is not less than a specified proportion, the plural detection proportion being a proportion of targets each having a plurality of arrival bearings, relative to all the detected targets; and
    determining, following the detection, that the covering member is adhered with materials that allow passage of the radar waves therethrough and become factors of noise.

* * * * *